United States Patent [19]

Becker et al.

[11] 4,219,661

[45] Aug. 26, 1980

[54] PROCESS FOR THE PRODUCTION OF URETHANES

[75] Inventors: Robert Becker; Johann Grolig, both of Leverkusen; Christian Rasp, Cologne; Gerhard Scharfe, Leverkusen, all of Fed. Rep. of Germany

[73] Assignee: Bayer Aktiengesellschaft, Leverkusen, Fed. Rep. of Germany

[21] Appl. No.: 32,581

[22] Filed: Apr. 23, 1979

[30] Foreign Application Priority Data

May 5, 1978 [DE] Fed. Rep. of Germany ....... 2819826

[51] Int. Cl.$^2$ .......................................... C07C 125/04
[52] U.S. Cl. .................................. 560/24; 260/465.4; 544/37; 560/9; 560/12; 560/25; 560/26; 560/27; 560/28; 560/30; 560/31; 560/115; 560/157; 560/158; 560/163; 560/164; 560/166
[58] Field of Search .................. 560/9, 12, 24, 25, 26, 560/27, 28, 30, 31, 115, 157, 158, 163, 164, 166; 544/37; 260/465.4

[56] References Cited

U.S. PATENT DOCUMENTS

| | | | |
|---|---|---|---|
| 3,338,956 | 8/1967 | Morentfield | 560/25 |
| 3,467,694 | 9/1969 | Hardy et al. | 560/25 |
| 3,531,512 | 9/1970 | Hardy et al. | 560/25 |
| 3,993,685 | 11/1976 | Zajacek et al. | 560/24 |

FOREIGN PATENT DOCUMENTS

| | | |
|---|---|---|
| 1568044 | 2/1970 | Fed. Rep. of Germany . |
| 2343826 | 3/1974 | Fed. Rep. of Germany . |
| 2421503 | 11/1974 | Fed. Rep. of Germany . |
| 2603574 | 8/1976 | Fed. Rep. of Germany . |
| 2614101 | 10/1976 | Fed. Rep. of Germany . |
| 2623694 | 12/1976 | Fed. Rep. of Germany . |

*Primary Examiner*—G. T. Breitenstein
*Attorney, Agent, or Firm*—Gene Harsh; Joseph C. Gil; Bruce E. Harang

[57] ABSTRACT

This invention relates to an improved process for the production of urethanes (i.e. carbamic acid esters) by reacting organic nitro compounds with carbon monoxide and organic compounds containing at least one hydroxy group in the presence of a unique catalyst system. The catalyst system consists of palladium or a palladium compound and iron oxychloride or a mixture of iron compounds containing iron oxychloride.

11 Claims, No Drawings

PROCESS FOR THE PRODUCTION OF URETHANES

BACKGROUND OF THE INVENTION

On an industrial scale, organic isocyanates are generally produced by reacting the corresponding amines with phosgene. Due to the toxicity of phosgene, attempts have long been made to find a commercially workable method of synthesizing organic isocyanates in which phosgene need not be used. One such synthesis comprises reacting organic nitro compounds with carbon monoxide and organic hydroxyl compounds to form the corresponding urethanes and subsequently splitting the urethanes thus formed into isocyanate and compounds containing hydroxyl groups. The urethane obtained as an intermediate product may even be modified before splitting. Thus, it possible, for example, to initially react the phenyl urethane obtainable from nitrobenzene, carbon monoxide and ethanol with formaldehyde to form the bis-urethane of 4,4'-diisocyanatodiphenyl methane and thereafter to convert the intermediate product thus obtained into 4,4'-diisocyanatodiphenyl methane by splitting off the ethanol.

The splitting of urethanes into the corresponding isocyanates and compounds containing hydroxyl groups is described, inter alia, in German Offenlegungsschrift No. 2,421,503.

Two main types of catalyst are described in the patent literature for the production of urethanes. Thus, German Offenlegungsschriften Nos. 2,343,826; 2,614,101 and 2,623,694 describe the reaction of organic nitro compounds with carbon monoxide and alcohols in the presence of selenium or selenium compounds to form urethanes. High urethane yields are obtained both with mono- and also with di-nitro compounds. The selenium compounds, particularly the organic selenium compounds formed as an intermediate stage during the reaction, and hydrogen selenide, are extremely toxic and must be quantitatively removed during working up, for example by a chemical reaction. This results in the need for an elaborate, chemical working-up stage which will adversely affect the economy of the process.

German Offenlegungsschriften Nos. 1,568,044 and 2,603,574, describe the use of noble metals, particularly palladium, in the presence of Lewis acids as catalysts. Anhydrous iron(III)chloride is disclosed as being a particularly effective Lewis acid. Although high urethane yields, based on the nitro compound used, are obtained using these catalysts, the yields based on the hydroxy compound used are unsatisfactory. Thus, where ethanol is used as the hydroxy component, large fractions of diethyl ether are obtained, the diethyl ether being formed because of the acid properties of the Lewis acid. At the same time, corrosion of the fine steel autoclaves used as reaction vessels is observed in cases where these noble metal/Lewis acid catalysts are used. Although this corrosion can largely be avoided by the addition of organic bases, such as pyridine (see, e.g., German Offenlegungsschrift No. 2,604,574), ether formation is still unreasonably high in the presence of these catalyst systems. Another disadvantage of these catalyst systems is that they can only be re-used to a limited degree. This is because the Lewis acids used are not sufficiently stable in the presence of the hydroxy compounds used.

DESCRIPTION OF THE INVENTION

It has now been surprisingly found that the liquid phase reaction of organic nitro compounds with carbon monoxide and organic compounds containing at least one hydroxy group to form urethanes at elevated temperature and pressure in the presence of palladium and/or palladium compounds, a transition metal compound and, optionally, tertiary amines can be carried out with particular selectivity relative to both the organic nitro compound used and the organic hydroxy compound if iron oxychloride or a mixture of iron compounds containing iron oxychloride is used as the transition metal compound.

Accordingly, the present invention relates to a process for the production of urethanes by the liquid phase reaction of organic nitro compounds with carbon monoxide and organic compounds containing at least one hydroxyl group at elevated temperature and pressure in the presence of palladium and/or palladium compounds and a transition metal compound, characterized in that iron oxychloride or a mixture of iron compounds containing iron oxychloride is used as the transition metal compound.

The iron oxychloride or the mixtures containing iron oxychloride used in accordance with the present invention may be produced in various ways. Thus, iron oxychloride can be obtained, for example, by treating iron(III)oxide with dry hydrogen chloride at temperatures in the range of from 230° to 290° C. (Z. anorgan. Chemie, Vol. 260, 292), the reaction taking place according to the following equation:

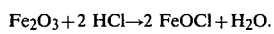

$$Fe_2O_3 + 2\ HCl \rightarrow 2\ FeOCl + H_2O.$$

Instead of using hydrogen chloride, it is also possible to use compounds which release hydrogen chloride, for example, the salts of tertiary amines, such as pyridinium chloride.

Another method of production (Bull.Soc.franc. Minéral. 58,6(1935)) comprises reacting iron(III)oxide with iron(III)chloride at elevated temperature according to the following reaction equation:

$$Fe_2O_3 + FeCl_3 \rightarrow 3\ FeOCl.$$

In addition, iron oxychloride can be obtained by hydrolyzing iron(III)chloride in the gas phase (Gmelins Handb. 8, Aufl. Eisen, Teil B, 318–319) or in the liquid phase by heating to 270°–330° C. in a bomb tube (N. Jahrb. Min. Beilagebd. 52, 334 (1925)), the reaction taking place according to the following equation:

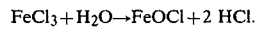

$$FeCl_3 + H_2O \rightarrow FeOCl + 2\ HCl.$$

One particularly advantageous method of production comprises thermally decomposing iron chloride hydrates under normal pressure at temperatures in the range of from 190° C. to 300° C. (Z. anorgan. Chemie, Vol. 260, 286), for example, according to the following reaction equation:

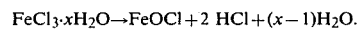

$$FeCl_3 \cdot xH_2O \rightarrow FeOCl + 2\ HCl + (x-1)H_2O.$$

Depending on the temperature at which the iron oxychloride is produced, the preparations may contain small to relatively large quantities of decomposition products which can reduce the activity of the iron oxychloride in the synthesis of the urethanes, particularly where the catalyst system is repeatedly recycled. The iron oxychloride does not have to be used in chemically pure form in the process according to the present invention. It is quite possible to use the mixtures of iron oxychloride with other iron compounds, particularly iron oxides, which are obtained in the commercial production of iron oxychloride. The compounds present in these mixtures in addition to the iron oxychloride are catalytically substantially inert substances whose nature is of no real significance to the workability of the process according to the present invention. In cases where it is decided not to use pure iron oxychloride, it is preferred to use mixtures containing at least 10% by weight and preferably at least 50% by weight of iron oxychloride. Iron(III)oxide which has been treated on its surface with hydrogene chloride at 230° to 290° C. and which thereby has been partly converted into iron oxychloride according to the first above mentioned equation is also very well suitable. Thus when iron(III)oxide powder having i.e. an average particle size of/from 0.001 to 0.1 mm is treated whith hydrogene chloride within said temperature range iron oxychloride is formed at the surface of the iron(III)oxide particles. If such iron(III)oxide containing iron oxychloride on its surface is used as cocatalyst it is often sufficient to modify the iron(III)oxide to the extent that only about 10% by weight of iron oxychloride, based of the some of iron oxychloride and iron(III)oxide are obtained to get a full conversion of the nitro compound and high selectivities. In the process according to the present invention, the iron oxychloride or the mixtures containing iron oxychloride are generally used in quantities which correspond to an iron oxychloride content in the reaction mixture, including any solvents used, of from 0.1 to 20% by weight, preferably from 1 to 5% by weight.

The manner in which the iron oxychloride assists in the reaction is not known in detail. Reduction-oxidation reactions, which cannot be precisely identified, very probably play a part. However, it is assumed that the acid-base-reactions which are essential in the case of the catalyst systems of the art containing Lewis acids are without any practical importance since iron oxychloride which is hardly soluble in organic liquids does not have any acidic properties in the sense of a Lewis acid.

Catalysts containing palladium and/or palladium compounds and also iron(III)compounds, particulay iron(II)oxide, recovered on completion of the reaction according to the present invention, may if necessary, be reactivated by oxidation, for example, using molecular oxygen (air), and converting the resulting iron(III) compounds, particularly the iron(III)oxide, into iron oxychloride.

One essential component is palladium or a palladium compound of the type exemplified below which is preferably added to the reaction mixture as such. It is even possible to add metallic palladium to the reaction mixture because the metallic palladium is oxidized into palladium(II)compounds by the iron oxychloride. It is also possible to use an inert support, for example, an aluminum oxide support, for the palladium.

It is particularly advantageous to add the palladium in the form of a compound which is soluble in the reaction mixture. Suitable palladium compounds include, for example, palladium chloride, palladium bromide, palladium iodide, sodium tetrachloropalladate, potassium tetrachloropalladate, sodium tetrabromopalladate, sodium tetraiodopalladate, potassium tetraiodopalladate, palladium acetate, palladium acetyl acetonate and similar soluble palladium compounds. Palladium chloride is a particularly preferred palladium salt. Palladium or the palladium compounds are preferably added in concentrations, based on the reaction mixture including any solvent used of from 0.0001 to 0.1% by weight and, with particular preference, in concentrations of from 0.001 to 0.01% by weight, expressed as metallic palladium. Where lower concentrations of palladium are used, the reaction velocity becomes too low. Although higher palladium concentrations are possible, they are uneconomical because of the possible losses of nobel metal, especially since there is no further increase in the urethane yields. In fact, one of the major advantages of the process according to the present invention is that it enables the urethanes to be produced in excellent yields using only very small quantities of palladium or palladium compounds.

In one particular embodiment of the process according to the present invention, bases, and preferably tertiary amines, are used as an additional component. The use of tertiary amines as an additional component increases selectivity in regard to possible, undesirable secondary reactions involving the organic hydroxy compounds used as reactants.

Suitable organic bases include, in particular, tertiary amines having molecular weights in the range of from 59 to 10,000 preferably 59 to 300. Aliphatic, cycloaliphatic, aromatic, araliphatic or heterocyclic tertiary amines are suitable. Other suitable organic bases include tertiary amines of the type which contain substituents that are inert under the reaction conditions, such as halogen, alkenyl, cyano, aldehyde, alkoxy, phenoxy, thioalkoxy, thiophenoxy, carbamyl, carboalkoxy and-/or thiocarbamyl substituents. Examples of suitable tertiary amines include trimethylamine, triethylamine, tripropylamine, tributylamine and the like; cycloaliphatic tertiary amines such as N,N-dimethyl cyclohexylamine, N,N-diethyl cyclohexylamine, 1,4-diazabicyclo-(2,2,2)-octane and the like; aromatic tertiary amines, such as N,N-dimethyl aniline, and N,N-diethyl aniline; heteroaromatic tertiary amines, such as pyridine, quinoline, isoquinoline, quinaldine and lepidine; pyrolyzed polyacrylonitrile or polyvinyl pyridine.

When used, the tertiary amines are preferably used in concentrations of from 0.1 to 10% by weight and, with particular preference, in concentrations of from 0.2 to 5% by weight, based on the reaction mixture.

Starting compounds suitable for the process according to the present invention include essentially any organic nitro compound, i.e., any organic compound containing nitro groups but which are otherwise inert under the conditions of the process according to the invention and which contain at least one aliphatically, cycloaliphatically and/or aromatically bound nitro group and generally have a molecular weight of from 61 to 400, preferably from 123 to 262. Any organic compounds containing at least one hydroxy group, for example, substituted or unsubstituted, aliphatic, cycloaliphatic and/or aromatic monohydroxy or polyhydroxy compounds generally having a molecular weight of from 32 to 228, preferably from 32 to 102, is also used.

The following aromatic nitro compounds may, for example, be used: nitrobenzene, o-dinitrobenzene, m-dinitrobenzene, p-dinitrobenzene, o-chloronitrobenzene, m-chloronitrobenzene, p-chloronitrobenzene, o-nitrotoluene, m-nitrotoluene, p-nitrotoluene, 2,3-dinitrotoluene, 2,4-dinitrotoluene, 2,5-dinitrotoluene, 2,6- dinitrotoluene, 3,4-dinitrotoluene, 3-nitro-o-xylene, 4-nitro-o-xylene, 2-nitro-m-xylene, 4-nitro-m-xylene, 5-nitro-m-xylene, nitro-p-xylene, 3,4-dinitro-o-xylene, 3,5-dinitro-o-xylene, 3,6-dinitro-o-xylene, 4,5-dinitro-o-xylene, 2,4-dinitro-m-xylene, 2,5-dinitro-m-xylene, 4,5-dinitro-m-xylene, 4,6-dinitro-m-xylene, 2,3-dinitro-p-xylene, 2,6-dinitro-p-xylene, 1-nitronaphthalene, 2-nitronaphthalene, dinitronaphthalenes, nitroanthracenes, nitrodiphenyls, bis-(nitrophenyl)-methanes, bis-(nitrophenyl)thioethers, bis-(nitrophenyl)-sulphones, nitrodiphenoxy alkanes, and nitrophenothiazines.

The following are examples of cycloaliphatic nitrocompounds: nitrocyclobutane, nitrocyclopentane, nitrocyclohexane, 1,2-dinitrocyclohexane, 1,3-dinitrocyclohexane, 1,4-dinitrocyclohexane, and bis-(nitrocyclohexyl)-methane.

The following are mentioned as examples of the group of nitroalkanes: nitromethane, nitroethane, 1-nitropropane, 2-nitropropane, nitrobutanes, nitropentanes, nitrohexanes, nitrodecanes, nitrocetanes, 1,2-dinitroethane, 1,2-dinitropropane, 1,3-dinitropropane, dinitrobutanes, dinitropentanes, dinitrohexanes, dinitrodecanes, phenyl nitromethane, bis-(nitromethyl)-cyclohexanes, bis-(nitromethyl)-benzenes, and ω-nitrocarboxylic acid nitriles.

Particularly preferred nitro compounds for the process according to the present invention are aromatic nitro compounds such as, in particular, nitrobenzene, 1,3-dinitrobenzene, 2,4-dinitrotoluene, 2,6-dinitrotoluene, dinitronaphthalenes (such as 1,5-dinitronaphthalene) or 2,4'- and 4,4'-dinitrodiphenyl methane.

Organic compounds containing hydroxy groups suitable for use in accordance with the present invention include monohydric alcohols, polyhydric alcohols, monohydric phenols and polyhydric phenols. The alcohols include linear or branched monohydric or polyhydric alkanols, cycloalkanols, alkenols, cycloalkenols, aralkyl alcohols and the like. These alcohols may contain a substituent containing oxygen, nitrogen, sulphur or a halogen atom, for example a halogen, sulphoxide, sulphone, amine, amide, carbonyl or carboxylic acid ester group. The following monohydric alcohols are mentioned by way of example: methyl alcohol, ethyl alcohol, propanol, isopropanol, butanol, pentanol, hexanol, cyclohexanol and benzyl alcohol. Suitable polyhydric alcohols are, for example, ethylene glycol, diethylene glycol, propylene glycol, dipropylene glycol, glycerol, hexane triol and the like, and polyols of higher functionality. It is preferred to use monohydric aliphatic alcohols containing from 1 to 6 carbon atoms, ethyl alcohol being particularly preferred.

Phenols suitable for use in accordance with the present invention include, for example, phenol, chlorophenols, cresols, ethyl phenols, propyl phenols, butyl phenols or higher alkyl phenols, pyrocatechol, resorcinol, 4,4'-dihydroxy diphenyl methane, bisphenol-A, anthranol, phenanthrol, pyrogallol, phloroglucinol and the like.

In the practical application of the process according to the present invention, the organic hydroxy compounds are generally used in such quantities that, where mononitro compounds are used as a starting material, the equivalent ratio between nitro groups and hydroxyl groups amounts to from 1:0.5 to 1:100, preferably from 1:1 to 1:100. Where dinitro compounds are used, the equivalent ratio ranges from 1:1 to 1:100.

It is particularly preferred to use the preferred alcohols in excess, the unreacted excess serving as a reaction medium.

The carbon monoxide is generally used in a quantity corresponding to from 1 to 30 mols of carbon monoxide per mol of nitro groups to be reacted, the carbon monoxide generally being introduced under pressure into the pressure reactor which is preferably used for the process.

The reaction according to the present invention may be carried out in the presence or absence of a solvent. In general, it is preferred to use an excess of the organic hydroxyl compound to serve as solvent. It is also possible, however, to use inert solvents in amounts equal to 80% by weight of the reaction mixture as a whole. The quantity in which the solvent is employed, irrespective of whether the solvent used is the hydroxyl compound used in excess or an inert solvent, must be measured in such a way that the heat of the exothermic urethane-forming reaction can be dissipated without a prohibitive increase in temperature. In general, therefore, the process according to the present invention is carried out using a concentration of nitro compounds of from 5 to 30% by weight, preferably from 5 to 20% by weight, based on the reaction mixture as a whole including the solvent.

Suitable solvents also include solvents which are inert to the reaction components and the catalyst system, such as aromatic, cycloaliphatic and aliphatic hydrocarbons which may optionally be substituted by halogen. Examples of such solvents include benzene, toluene, xylene, chlorobenzene, dichlorobenzene, trichlorobenzene, chloronaphthalene, cyclohexane, methyl cyclohexane, chlorocyclohexane, methylene chloride, carbon tetrachloride, tetrachloroethane, trichlortrifluoroethane and similar compounds.

The reaction temperature is generally in the range of from 100° C. to about 300° C., preferably from 150° C. to 250° C. and most preferably from 170° C. to 200° C. The pressure must be gauged in such a way that the presence of a liquid phase is always guaranteed, and in general is in the range of from 5 to 500 bars, and preferably from 50 to 300 bars at the reaction temperature. Depending upon the nitro compound or hydroxy compound used, the reaction time required for a quantitative conversion amounts to between a few minutes and several hours.

The reaction of the nitro compounds with the hydroxy compounds and carbon monoxide to form urethanes may be carried out continuously or in batches.

In the case of batch operation, the reaction may be carried out in a high-pressure autoclave using small quantities of a homogeneously dissolved palladium compound in the presence of a complexing tertiary amine, such as pyridine, and an adequate excess of iron oxychloride or a mixture of iron compounds containing iron oxychloride, the iron oxychloride being generally used in a molar excess, based on the palladium or the palladium compounds. The iron oxychloride, which is only sparingly soluble in the reaction medium at low temperatures, is added in the form of a fine powder which accelerates the dissolution taking place at elevated temperature. The partly undissolved excess iron oxychloride and insoluble constituents of the mixture may be dispersed by vigorous stirring or by pump-recirculating the reaction mixture. The heat of the exothermic reaction may be dissipated by internally installed cooling units, or, in the case of pump-recirculation, even through an external heat exchanger. Working up and recycling of the catalyst may be carried out in different ways, depending upon the solubility of the urethane produced in the reaction mixture. In the case of readily soluble urethanes, it is possible, for example, to separate most of the iron oxychloride which is sparingly soluble at low temperatures, together with most of the adsorbed palladium and the organic base, from the reaction product on completion of the reaction, for example by filtration or centrifuging. These constituents, can then be returned to a new reaction mixture of nitro compounds, hydroxy compounds and carbon monoxide. The liquid reaction mixture may be separated in the usual way, for example by fractional distillation, into solvent, the pure urethanes and small quantities of secondary products, if any. This separation may be carried out continuously or in batches. The distillation residue contains small quantities of the iron oxychloride dissolved in the reaction mixture and its decomposition products, if any, and/or traces of palladium and/or palladium compounds. These may be directly returned to the reaction or may be completely or partly subjected under the conditions of the iron oxychloride formation to a thermal treatment, optionally using air or chemical oxidizing agents (for example, a nitro compound of the type used as starting material). it is also possible to treat the residue in the presence of solvents of the type mentioned by way of example above, water, hydrogen chloride and/or chlorides such as pyridinium chloride or quinaldium chloride. The resultant treated residue is thereafter returned to the reaction as active species for the selective urethane formation.

In cases where the urethanes are sparingly soluble in the solvent or in the excess hydroxy compound, the reaction mixture may be worked up in modified form. For example, most of the catalyst can be filtered off or centrifuged off after venting under pressure and at an elevated temperature at which the urethanes are still dissolved, whereas the palladium/iron oxychloride catalyst system largely precipitates. After this, the sparingly soluble urethane crystallizes out by a reduction in temperature, optionally together with small quantities of sparingly soluble secondary products and residual catalyst. The mother liquor which contains, in addition to solvent or the excess organic hydroxy compound used as solvent, small quantities of secondary products, dissolved urethane and, possibly, dissolved iron oxychloride or soluble iron compounds formed therefrom, may be returned to the reaction mixture of the nitro compounds with the hydroxy compounds and carbon monoxide. The mother liquid may be returned either directly or after the removal of low-boiling secondary products, for example by distillation, the quantity of nitro compound and hydroxy compound corresponding to the previous conversion being made up. Higher boiling secondary products which are not removed by crystallization may be continuously removed form the recycle stream as distillation residue by working up an aliquote portion of the mother liquor by distillation. The crude urethane precipitated may be recrystallized, for example, by crystallization from a solvent which dissolves the urethane at elevated temperatures, but does not dissolve the secondary products and the catalyst residues, such as iso-octane, benzene, toluene, xylene, chlorobenzene, dichlorobenzene. The residues insoluble at elevated temperature may be converted by oxidation as described above into iron oxychloride and a waste gas resulting from the organic impurities which consists essentially of carbon dioxide, oxygen, nitrogen and readily volatile organic impurities, if any. Depending on its composition, the waste gas may be directly let off into the atmosphere or may additionally be subjected to catalytic post-combustion in which residual impurities are removed by oxidation. The active iron oxychloride obtained from the residue which may still contain small quantities of palladium and/or palladium compound is returned to the reaction mixture of the nitro compounds with hydroxy compounds and carbon monoxide.

The continuous reaction may be carried out in a cascade of vessels, in a nested-tube reactor, in several loop reactors arranged one behind the other or in one or more adiabatic reaction tubes arranged one behind the other. The heat is dissipated, for example, either internally by built-in cooling units, externally through a nested-tube heat exchanger or adiabatically through the thermal capacity of the reaction mixture followed by cooling in external cooling units.

Further working up may be carried out as described above either continuously or in batches.

In the preferred application of the end products of the process according to the present invention as intermediate products for the production of the corresponding isocyanates, purification is often superfluous. Instead, it may be sufficient for the purposes of further processing to use the crude products obtained after filtration of the catalyst and, optionally, distillation of the solvent.

The process according to the present invention is illustrated by the following Examples although the invention is by no means limited to the conditions described therein.

EXAMPLES

EXAMPLE 1

A. Production of the iron oxychloride catalyst (Z. anorg. Chem. 260, 288 (1949)):

200 g of iron(III)chloride hydrate ($FeCl_3 \cdot 6\ H_2O$) are added to a spherical flask equipped with a descending condenser. The flask is then immersed for 80 minutes in an oil bath at 250° C. The hydrate begins to boil at around 122° C. The temperature increases rapidly with decreasing water content. At the same time, the amount of hydrogen chloride given off in addition to water increases. A brown microcrystalline product having the almost stoichiometric composition (FeOCl is obtained according to the following reaction equation:

$$FeCl_3 \cdot 6\ H_2O \rightarrow FeOCl + 2\ HCl + 5\ H_2O.$$

B. Reaction of nitrobenzene, ethanol and carbon monoxide to form phenyl urethane:

A solution of 25 g of nitrobenzene in 225 g of ethanol together with 0.1 g of palladium chloride (0.04% by weight), 3.0 g of the iron oxychloride produced in accordance with A (1.1% by weight) and 15.3 g of pyridine (5.7% by weight) were introduced into a 0.7 liter autoclave of stainless steel, followed by the introduction at room temperature of carbon monoxide under a pressure of 120 bars. The contents of the autoclave were heated to 180° C., a maximum pressure of 190 bars being adjusted, and were left for 2 hours at that temperature. The pressure then amounted to 165 bars. After cooling to room temperature, the reaction gas was vented through a cold trap and the liquid contents of the autoclave, together with the liquid deposited in the cold trap, were analyzed by gas chromatography. The nitrobenzene conversion amounted to 100%. The selectivity for phenyl urethane (ethyl-N-phenyl carbamic acid ester), based on nitrobenzene, also amounted to 100%. No diethyl ether could be detected.

EXAMPLE 2

The procedure was a described in Example 1, except that the palladium chloride was replaced by the same amount of palladium iodide. The nitrobenzene conversion as determined by gas chromatography again amounted to 100%, the selectivities for phenyl urethane amounted to 79 mol %, based on nitrobenzene, and to 85 mol %, based on the ethanol reacted. No diethyl ether could be detected by gas chromatography.

EXAMPLE 3

The procedure was as described in Example 1, except that the concentration of the palladium chloride was reduced to 0.002% by weight, based on the mixture as a whole, and the concentration of the iron oxychloride was increased to 3.6% by weight. For a nitrobenzene conversion of 48%, the phenyl urethane selectivities obtained amounted to 100%, based on the nitrobenzene reacted, and to 89%, based on the ethanol reacted. Diethyl ether was formed in a quantity of 4 mol %, based on the ethanol reacted.

EXAMPLE 4

This Example demonstrates the influence exerted by the concentrated of tertiary amine. The palladium concentration amounted to 0.002% by weight and the iron oxychloride concentration to 3.8% by weight. Pyridine was used as the tertiary amine in the amounts set forth in Table I. The other conditions correspond to those described in Example 1.

TABLE I

| Pyridine concentration % by weight | Nitrobenzene conversion % | Selectivity (mol %) | | |
|---|---|---|---|---|
| | | Phenyl urethane selectivities based on | | |
| | | nitrobenzene | ethanol | Diethyl ether based on ethanol |
| 0 | 71 | 82 | 66 | 27 |
| 0.4 | 100 | 89 | 86 | 7 |
| 0.8 | 100 | 90 | 89 | 4 |
| 1.1 | 100 | 92 | 89 | 4 |
| 1.9 | 100 | 95 | 93 | 4 |
| 5.8 | 100 | 100 | 89 | 4 |

The Table shows the influence exerted by the amine concentration. As little as 0.4% of pyridine largely prevents formation of the undesirable diethyl ether.

EXAMPLE 5 (Comparison Example 1)

A mixture of 0.002% of palladium chloride, 3.5% of iron(III)chloride and 3.3% of pyridine was used as the catalyst system. This procedure corresponds to the procedure described in German Offenlegungsschrift No. 2,603,574 where iron(III)chloride is added as the activating Lewis acid. The reaction of nitrobenzene, ethanol and carbon monoxide to form phenyl urethane was carried out using this catalyst system under the conditions described in Example 4.

The pyridine concentration amounted to 1.8% by weight which is comparable with the next to the last test of Example 4. Nitrobenzene was quantitatively reacted and the phenyl urethane selectivity amounted to 95 mol %, based on nitrobenzene and was therefore also comparable with the selectivity indicated in Example 4. In contrast, the phenyl urethane selectivity based on the ethanol reacted amounted to only 72.5 mol%; diethyl ether (24 mol%) being formed as the main secondary product. In Example 4 using iron oxychloride as co-catalyst, the phenyl urethane selectivity based on the ethanol amounted to 93 mol %, the undesirable secondary product, diethyl ether, being formed in a quantity of only 4 mol %. This comparison shows the advantages of the catalyst system used according to the present invention over known catalysts.

EXAMPLE 6

This Example illustrates the way in which the addition of iron oxychloride acts where palladium metal is used on an inert support. 0.7% by weight (the percentages by weight are based in each case on the mixture as a whole) of a supported palladium catalyst consisting of 5% by weight of palladium and 95% by weight of aluminum oxide was added together with 1.1% by weight of iron oxychloride and 5.7% by weight of pyridine to a 4% solution of nitrobenzene in ethanol. The reaction was carried out under the same conditions as described in Example 1. For a quantitative nitrobenzene conversion, the phenyl urethane selectivities amounted to 90 mol %, based on nitrobenzene, and to 80 mol %, based on ethanol. Only 1 mol % of diethyl ether was formed. In the absence of the iron oxychloride, no conversion was observed using the palladium/aluminum oxide catalyst.

EXAMPLE 7

A solution of 6.8% by weight of 2,4-dinitrotoluene in ethanol was reacted under the conditions described in Example 1 in the presence of 0.002% by weight of palladium chloride, 3.8% by weight of iron oxychloride and 3.8% by weight of pyridine. A yield of 98% of the theoretical of diethyl toluene-2,4-dicarbamate (bis-urethane of tolylene-2,4-diisocyanate) was determined by liquid-chromatographic analysis. Less than 1 mol % of diethyl ether was formed, based on the ethanol reacted.

EXAMPLE 8

The procedure was as described in Example 1 except that mixtures having different contents of iron oxychloride were added as co-catalyst. The remaining iron of the mixtures was present in the form of iron oxyhydrate of varying water content. The results obtained with these mixtures are shown in the following Table:

| FeOCl-content in the mixture % of input according to Example 1 | Nitrobenzene conversion % | Phenyl urethane selectivity (based on the nitrobenzene reacted) % |
|---|---|---|
| 0 | 0 | 0 |
| 28 | 62 | 72 |
| 59 | 100 | 92 |
| 67 | 100 | 93 |
| 75 | 100 | 99 |

EXAMPLE 9

The cocatalyst used in following example was prepared by treating α-iron(III)oxide powder having an average particle size of about 0,002 to 0,05 mm with hydrogene chloride at 240° C. in a heatable quartz reactor. The cocatalyst thus obtained contained 13% by weight of iron oxycloride, based on the sum of iron-(III)oxide and iron oxychloride.

The method of example 1 is repeated; above iron-(III)oxide/ironoxychloride cocatalyst is used in an amount of 3,8% by weight. Palladium chloride was used in an amount of 0,002% by weight.

The nitrobenzene conversion amounted to 100%. The selectivity for phenyl urethane based on nitrobenzene amounted to 96% and based on ethanol to 87%.

What is claimed is:

1. A process for the production of urethanes comprising reacting organic nitro compounds with carbon monoxide and organic compounds containing at least one hydroxyl group in the liquid phase at elevated temperature and pressure in the presence of palladium and/or palladium compounds and either iron oxychloride or a mixture of iron compounds containing iron oxychloride.

2. The process of claim 1, characterized in that the iron oxychloride or the mixture containing iron oxychloride is used in such a quantity that the concentration of iron oxychloride amounts to from 0.1 to 20% by weight, based on the reaction mixture as a whole.

3. The process of claim 2, wherein the palladium or palladium compounds is used in an amount of from 0.0001 to 0.1% by weight, expressed as metallic palladium, and based on the reaction mixture as a whole.

4. The process of claim 3, wherein the concentration of iron oxychloride amounts to from 1 to 5% by weight, wherein the concentration of palladium is from 0.001 to 0.01% by weight, and wherein a tertiary amine is included in the mixture in an amount of from 0.1 to 10% by weight.

5. The process of claim 1, characterized in that nitrobenzene is used as the nitro compound.

6. The process of claim 1, characterized in that dinitrotoluene is used as the nitro compound.

7. The process of claim 6, characterized in that a monohydride aliphatic alcohol containing from 1 to 6 carbon atoms is used as the organic compound containing at least one hydroxy group.

8. The process of claim 7, characterized in that ethanol is used as the organic compound containing at least one hydroxy group.

9. The process of claim 1, characterized in that the reaction is carried out at a temperature in the range of from 150° C. to 250° C.

10. The process as claimed in claim 9, characterized in that the reaction is carried out under a pressure of from 5 to 500 bars.

11. A process for the production of urethanes comprising reacting organic nitro compounds with carbon monoxide and organic compounds containing at least one hydroxyl group in the liquid phase at elevated temperature and pressure in the presence of (a) palladium and/or palladium compounds, (b) iron oxychloride or a mixture of iron compounds containing iron oxychloride, and (c) tertiary amines.

* * * * *